Aug. 28, 1962

P. P. GUNERATNE ET AL 3,051,641

NUCLEAR REACTOR FUEL ELEMENT HAVING A THERMOCOUPLE
JUNCTION WITHIN ITS SHEATH

Filed July 29, 1957

PIYATILLEKE PERERA GUNERATNE
MEVILLE YOUNG
GEORGE HENRY FRENCH

Inventors

*Larson and Taylor*

Attorneys 3,051,641
NUCLEAR REACTOR FUEL ELEMENT HAVING A THERMOCOUPLE JUNCTION WITHIN ITS SHEATH
Piyatilleke Perera Guneratne, Seascale, and Melville Young and George Henry French, Whitehaven, England, assignors to United Kingdom Atomic Energy Authority, London, England
Filed July 29, 1957, Ser. No. 674,709
Claims priority, application Great Britain July 27, 1956
4 Claims. (Cl. 204—193.2)

This invention relates to nuclear reactors.

A limiting factor in present day nuclear reactor design is that of temperature of the sheath material enclosing the nuclear fuel. In order that the reactor may be operated to keep the temperature of the sheath material as high as possible with safety it is desirable that the sheath temperature should be presented to the control operator accurately and with minimum time lag. A small thermocouple is a satisfactory device for such temperature measurement, but the problem then arises of securing the thermocouple to the sheath material to withstand operating conditions in the reactor whilst maintaining close thermal contact. A welding or similar technique requires association of at least three differing materials, the thermocouple pair material and the sheath material, and probably other materials such as fluxes, any of which may be objectionable. The present invention provides an arrangement for bringing a thermocouple into close thermal contact with a fuel element sheath, which avoids welding or brazing.

According to the invention a nuclear reactor fuel element comprising a fuel member enclosed in a protective sheath, said sheath defining a passageway open at both ends, and a thermocouple cable terminated in a thermocouple junction, said cable being of smaller section than said passageway and having its end deformed and forcefitted into said passageway.

Figure 3:
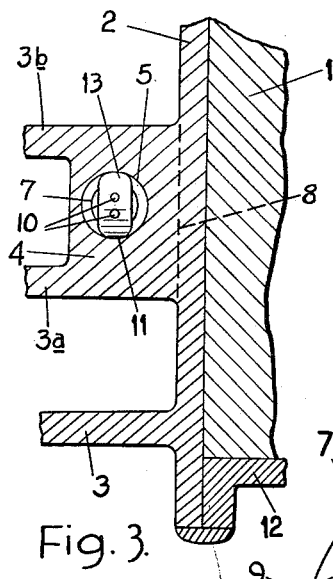
Figure 1:
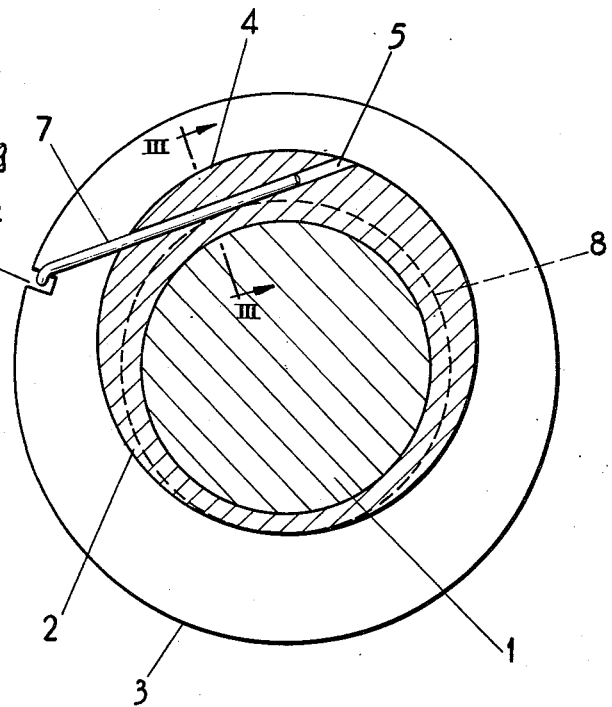
Figure 2:
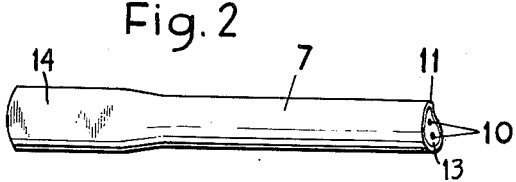

An embodiment of the invention will now be described with reference to the accompanying drawings in which FIGURE 1 is a sectional view of a radially finned fuel element, FIGURE 2 is a side elevation of the wedge shaped end of a thermocouple cable for association with the element of FIGURE 1 and FIGURE 3 is an enlarged fragmentary section on the line III—III of FIGURE 1.

A fuel element comprising a fuel member 1 and a magnesium alloy sheath 2 having radial fins 3 has a single eccentric fin root 4 formed between two fins 3a, 3b near the cap 12 on the base of the fuel element. A hole 5, 0.0635" in diameter, is drilled through the eccentric fin root 4 such that the minimum thickness between the hole 5 and the inner surface of the sheath is the same as the normal sheath thickness as indicated by dotted circle 8 (FIG. 1) and dotted line 8 (FIG. 3). A thermocouple cable 7 comprising conductor wires 10 embedded in magnesia 13 in a stainless steel sheath 11 of 0.0625" nominal diameter has one end welded to form a hot junction between the conductors 10 (FIG. 2) inside the cable and the cable sheath 11, and this end of the cable is pushed through the hole 5 so that it protrudes clear of the fins 3. The hot junction is then flattened with a suitable tool over a length of approximately 1/10" so that the greatest dimension at the tip of the hot junction is between 0.070" and 0.073" (FIGURES 2 and 3). The thermocouple cable is then pulled back with a tensile load of between 32 and 48 lbs. until the tip of the hot junction is about 1/16" to 1/8" inside the hole 5. The open end of the hole 5 may be stopped by peening the sheath or punching gently. The cable 7 is led along the fuel element in slots 9 cut in the fins 3.

We claim:
1. In a nuclear reactor, an elongated fuel member clad in a protective sheath having a uniform characteristic thickness and an enlarged portion extending radially outwardly from the characteristic outer periphery of the sheath, said enlarged portion being disposed eccentrically about the longitudinal axis of the sheath and defining a passageway open at its ends to an external surface of said eccentrically disposed enlarged portion, and a thermocouple cable having a diameter smaller than that of the passageway and extending within and terminating in the passageway, the terminal portion of the cable being formed with a thermocouple junction and having a diameter so greater than that of the passageway as to forcibly engage therein.

2. The combination according to claim 1 wherein the passageway extends within the ececntrically disposed enlarged portion tangentially of said characteristic outer periphery of the sheath.

3. The combination according to claim 2 wherein the sheath has a series of spaced, radially outwardly extending fins thereon and the eccentrically disposed enlarged portion is disposed in the space between an adjacent pair of the fins and of smaller radial extent than the pair of fins.

4. The combination according to claim 3 wherein the terminal portion of the cable has a flattened section the larger diameter of which is so greater than the diameter of the passageway as to forcibly engage therein.

References Cited in the file of this patent
UNITED STATES PATENTS

| | | |
|---|---|---|
| 1,486,032 | Pourcel | Mar. 4, 1924 |
| 2,790,760 | Powell | Apr. 30, 1957 |
| 2,856,341 | Kanne | Oct. 14, 1958 |

FOREIGN PATENTS

| | | |
|---|---|---|
| 114,151 | Australia | May 3, 1940 |
| 216,588 | Australia | Jan. 31, 1957 |

OTHER REFERENCES

TID–7001, Buch and Leyse, May 7, 1951, pp. 240–241, O.T.S. Dept. of Comm., Washington, D.C.

ORNL–1537, March 11, 1954, in particular page 5, Available from Union Carbide and Carbon Corp., P.O. Box P., Oak Ridge, Tenn.

IDO–16388, February 15, 1957. Available from OTS, Department of Comm., Washington 25, D.C.